US005871329A

United States Patent [19]

Tidrick et al.

[11] Patent Number: 5,871,329

[45] Date of Patent: Feb. 16, 1999

[54] POWERED WHEELCHAIR RAMP FOR MINIVANS

[75] Inventors: Gregg Alan Tidrick, Chandler; David H. Eaton, Jr., Phoenix, both of Ariz.

[73] Assignee: U.S. Vantage Company LLC, Phoenix, Ariz.

[21] Appl. No.: 861,326

[22] Filed: May 21, 1997

[51] Int. Cl.[6] .......... B60P 1/43

[52] U.S. Cl. .......... 414/537; 14/71.3; 414/921

[58] Field of Search .......... 414/537, 538, 414/921; 14/71.1, 71.3

[56] References Cited

U.S. PATENT DOCUMENTS

| | | | |
|---|---|---|---|
| 2,541,288 | 2/1951 | Rice | 414/537 |
| 3,500,486 | 3/1970 | Le Clear | 14/71.3 |
| 3,874,527 | 4/1975 | Royce | 414/537 |
| 4,922,568 | 5/1990 | Hageman | 14/71.3 |
| 5,391,041 | 2/1995 | Stanbury et al. | 414/537 |
| 5,649,803 | 7/1997 | Bennett | 414/537 |
| 5,676,515 | 10/1997 | Haustein | 414/537 |

FOREIGN PATENT DOCUMENTS

| | | | |
|---|---|---|---|
| 2512756 | 3/1983 | France | 414/921 |

*Primary Examiner*—David A. Bucci
*Attorney, Agent, or Firm*—Fennemore Craig

[57] ABSTRACT

A powered wheelchair ramp includes a drive mechanism having a gear, a cam, and a lever arm keyed to a common shaft to prevent relative motion among these elements. An electric motor drives the gear through a clutch and the lever arm raises or lowers a folding ramp. Energy storage device engage the cam through a follower for storing energy as the ramp is lowered. The energy storage device also damps the motion of the ramp. When the ramp is raised, the energy storage device aids lifting the ramp. The torques applied to the common shaft are such that the net torque in either direction about the shaft is below a predetermined amount. The result is that the ramp can be raised and lowered easily, even by a single person in a wheelchair sitting beside the ramp. The clutch is released for manual operation and can engage at any point for powered operation.

8 Claims, 2 Drawing Sheets

POWERED WHEELCHAIR RAMP FOR MINIVANS

BACKGROUND OF THE INVENTION

This invention relates to a wheelchair ramp for a minivan and, in particular, to a battery powered ramp that can be extended or retracted easily even when there is no battery power available.

It is known in the art to provide a ramp for enabling a person in a wheelchair to enter or leave a vehicle. Trucks, buses, and large vans have a high ground clearance and are typically provided with a lifting mechanism to augment a ramp, which would be too long or too steep otherwise. The ramp in such mechanisms merely provides a gradual transition from the ground to the height of a platform that is raised or lowered. A type of light truck known as a minivan has a lower ground clearance than larger vehicles. Thus, a ramp can be used without a lift and the ramp typically folds in half when stored.

In the prior art, minivans are typically provided with a battery powered, folding ramp having a plurality of interlocks to prevent improper usage. For example, if the side door of a minivan is not opened fully, the ramp is prevented from extending. As long as power is available, ramps of the prior art work reliably and well. In the event of a power failure, the operation of known ramps leaves much to be desired.

In the prior art, it is generally assumed that a power failure occurs with a person in the minivan and that exiting the vehicle is all-important. Typically, a release mechanism is provided for extending the ramp after the door is opened. The ramp free-falls into an open position, creating a dangerous situation for someone standing near the open door. Often, the ramp free-falls quickly enough that the cabling used to extend the ramp does not operate properly and the end of the ramp slams into the ground at a steep angle and must be re-positioned manually. A folding metal ramp is heavy and cannot be handled by a person sitting in a wheelchair. Even for someone able to move about freely, a folding ramp is difficult to handle and it is preferred that two people control the ramp.

In the event of a power failure, it is not simply a matter of extending or retracting the ramp manually. The manual release mechanism in the mechanical drive for the ramp must be re-set. This usually requires some reassembly of the mechanical drive. Thus, for example, a power failure due to a blown fuse has the effect of stranding a wheelchair bound person or at least greatly delaying his travel while the system is restored to working order.

While there are many obvious solutions to the problem, such as a back-up power supply, one must realize that a ramp and a drive mechanism must fit an existing vehicle, i.e. a ramp is designed for the vehicle, not the other way around. A minivan is, by definition, a small van. Thus, most solutions to the problem are either too big, too expensive, or simply impractical. One wants to modify a minivan in a way that changes the finished appearance of the minivan as little as possible. Finding a location where a second battery, and the associated switching and charging apparatus, is both hidden and accessible is not easy in a minivan and is more difficult in a minivan that has already been heavily modified to accommodate a powered ramp. Similarly, any other solution to the problem must fit within commercially available vehicles without significantly affecting the space available for passengers or cargo.

In view of the foregoing, it is therefore an object of the invention to provide an electrically powered ramp that can be extended or retracted easily even when there is no electricity available.

Another object of the invention is to provide a compact drive mechanism for a ramp for a minivan, wherein the drive mechanism for the ramp is as unobtrusive as possible within the minivan.

A further object of the invention is to provide a compact drive mechanism for a ramp wherein the mechanism stores energy for raising and lowering the ramp without electrical power.

Another object of the invention is to reduce the electrical power required to raise and lower a powered ramp for a minivan.

A further object of the invention is to prevent a powered folding ramp from free-falling open in the event of a power failure.

Another object is to provide a controlled operation of a folding, powered ramp when power is interrupted.

A further object of the invention is to provide a powered ramp that can be operated manually or electrically at the discretion of the user.

Another object of the invention is to provide a powered ramp that can be operated part-way electrically and then operated manually, or vice-versa, from any point in the movement of the ramp.

SUMMARY OF THE INVENTION

The foregoing objects are achieved in this invention in which a gear, a cam, and a lever arm are keyed to a common shaft to prevent relative motion among these elements. An electric motor drives the gear through a clutch and the lever arm raises or lowers a folding ramp. Energy storage means engage the cam through a follower for storing energy as the ramp is lowered. The energy storage means also damps the motion of the ramp. When the ramp is raised, the energy storage means aids lifting the ramp. The torques applied to the common shaft are such that the net torque in either direction about the shaft is below a predetermined amount. The result is that the ramp can be raised and lowered easily, even by a single person in a wheelchair sitting beside the ramp. The clutch is released for manual operation and can engage at any point for powered operation.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
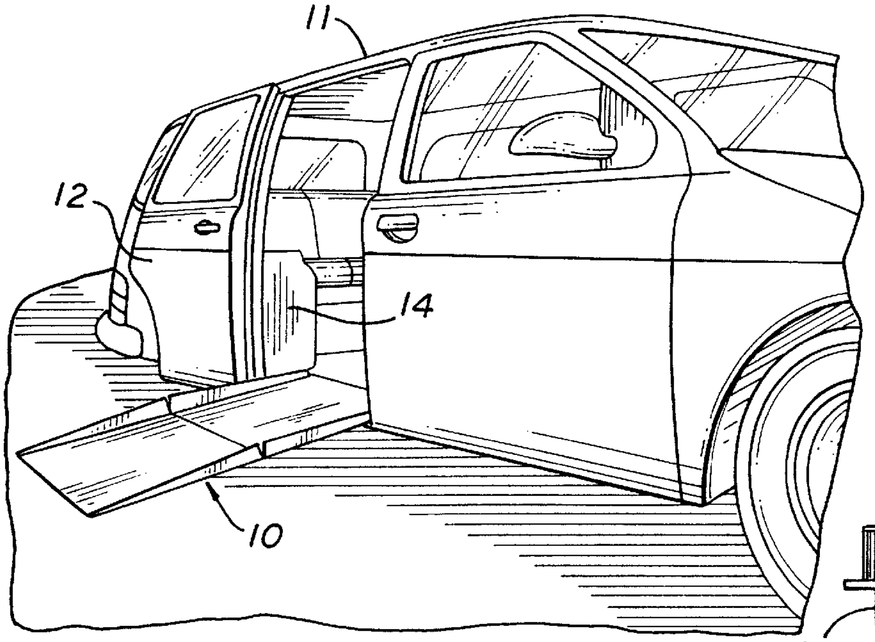
FIG. 1 is a perspective view of a folding ramp extending from a minivan.

FIG. 1 illustrates the right hand side of a minivan having folding ramp 10 attached to the minivan and extending through the opening for sliding door 12. Within minivan 11, drive mechanism 14 is positioned adjacent the open doorway and is mechanically coupled to ramp 10 for raising and lowering the ramp. A battery (not shown) in minivan 11 provides electrical power for drive mechanism 14. In accordance with the invention, drive mechanism 14 is approximately the same size as drive mechanisms of the prior art, despite the greatly increased functionality of a drive mechanism constructed in accordance with the invention.

Figure 2:
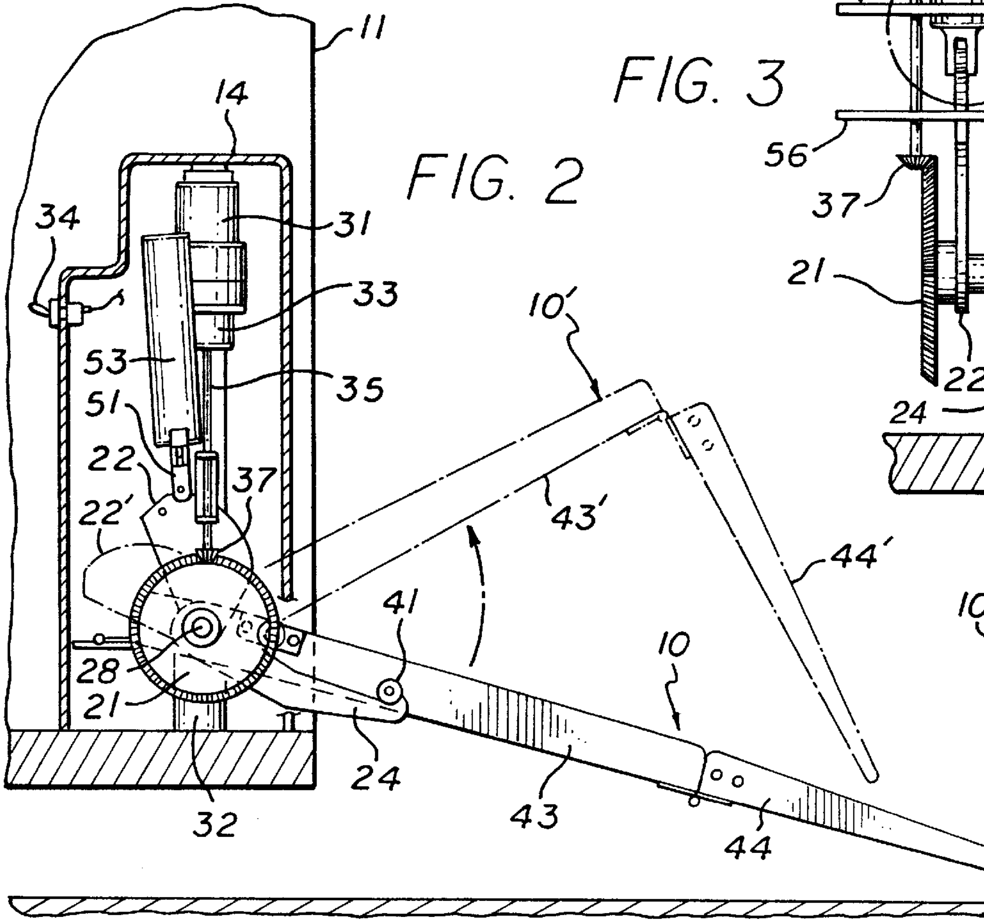
FIG. 2 is a side view of a drive mechanism constructed in accordance with a preferred embodiment of the invention and illustrating the extension of the folding ramp.

FIG. 2 is a cut-away view of drive mechanism 14, showing the internal construction of the drive mechanism. Drive mechanism 14 includes gear 21, cam 22 and lever arm 24 keyed to common shaft 28. Gear 21 is driven by motor 31 through clutch 33 coupled to drive shaft 35 and bevel gear 37. Motor 31 is attached to column 32 and is controlled through a plurality of electrical switches and interlocks, represented by switch 34, for causing motor 31 to turn drive shaft 35 in one direction or the other to raise or lower ramp 10. Motor 31 and clutch 33 are commercially available devices.

As common shaft 28 rotates in either direction, cam 22 rotates with the shaft. The peripheral surface of cam 22 engages the end of plunger 51, which is coupled to a spring (not shown in FIG. 2) within cylinder 53. Cam 22, plunger 51, and the spring form an energy storage means for storing energy as ramp 10 is extended and for releasing energy as the ramp is retracted.

As illustrated in FIG. 2, cam 22 is at approximately its maximum radius, plunger 51 extends a minimum amount from cylinder 53, and the spring within cylinder 53 is substantially compressed. As common shaft 28 rotates counterclockwise, the radius of cam 22 decreases, and the spring in cylinder 53 extends as the ramp is raised to the position indicated at 43' and 44'. The energy stored in the compressed spring is released and acts through cam 22 to force common shaft 28 to rotate in a counterclockwise direction. Because cam 22 is keyed to common shaft 28, energy is stored and released each time the ramp is extended or retracted. The force supplied by the spring reduces the net torque on common shaft 28 and, thereby, reduces the load on motor 31.

Folding ramp 10 includes upper section 43 and lower section 44 extending as shown in FIG. 2. Arm 24 raises and lowers upper portion 43 of the ramp. Lower portion 44 is connected to upper portion 43 by a hinge. A cable mechanism (not shown) pulls lower portion 44' into the position indicated at 44 as ramp 10 is lowered. Lever arm 24 engages ramp 10 through roller 41, which is attached to upper portion 43 and rotates freely about a suitable fastener. Roller 41 rotates as the fastener moves along the length of lever arm 24, thereby providing a low friction coupling between the ramp and the lever arm. Roller 41 moves relative to lever arm 24 because upper portion 43 and common shaft 28 do not rotate about the same axis.

Gear 21, cam 22, and lever arm 24 each produce a torque about common shaft 28. Lever arm 24 produces a maximum torque when ramp 10 is fully extended. Because ramp 10 folds, the torque on lever arm 24 decreases rapidly as common shaft 28 rotates counterclockwise. Cam 22 is profiled to produce a decreasing amount of torque as common shaft 28 rotates counterclockwise to retract ramp 10 and the cam profile accommodates the decrease in force supplied by the spring in cylinder 53 as plunger 51 extends further from the cylinder.

The difference in torques between cam 22 and lever arm 24 is overcome by the torque supplied by motor 31 through gear 37 and gear 21. When power is unavailable or cut-off, clutch 33 disengages. If ramp 10 were in the position indicated at 10', the torque provided by cam 22 is less than the torque provided by lever arm 24. Ramp 10 does not free fall because of friction in the energy storage means that damps the motion of the ramp and because of the opposing torque from the energy storage means. Thus, the energy storage means both stores and dissipates energy, supplying two forces to counteract the ramp, the force from a spring and the force of friction.

In a preferred embodiment of the invention, the torque from cam 22 is greater than the torque from lever arm 24 when the lever arm is nearly vertical, i.e. when the ramp is almost fully raised, e.g. when upper portion 43 is within 15° of vertical. A positive net torque makes it easier to raise the ramp and holds the ramp in place when the door of a minivan is opened. A person in a wheelchair in the minivan can easily push the ramp to lower the ramp. Once upper portion 43 swings past approximately 15°, the ramp begins a controlled descent under the force of gravity, opposed by the torque from cam 22. If motor 31 is running, the descent of the ramp is also opposed by the torque on gear 21.

Figure 3:
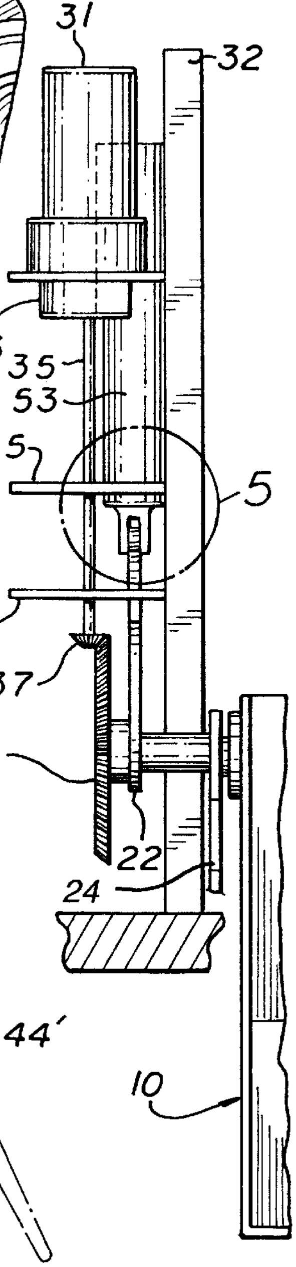
FIG. 3 is a front view of the drive mechanism illustrated in FIG. 2.

FIG. 3 is a front view of the drive mechanism, illustrating the longitudinal displacement of the elements along common shaft 28. Motor 31 and cylinder 53 are attached to column 32 which both supports and aligns the devices. Common shaft 28 is attached to column 32 by a suitable bearing (not shown). As illustrated in FIG. 3, gear 21 is at the left end of common shaft 28 and cam 22 is just to the right of gear 21. Lever arm 24 is on the opposite side of the column 32 from cam 22 and is positioned adjacent ramp 10. Lever arm 24 is preferably near ramp 10 but the arrangement of the components along common shaft 28 is otherwise not critical. Guides 55 and 56 are attached to column 32 and are optionally provided for stabilizing drive shaft 35 which passes through apertures in the guides.

Figure 4:
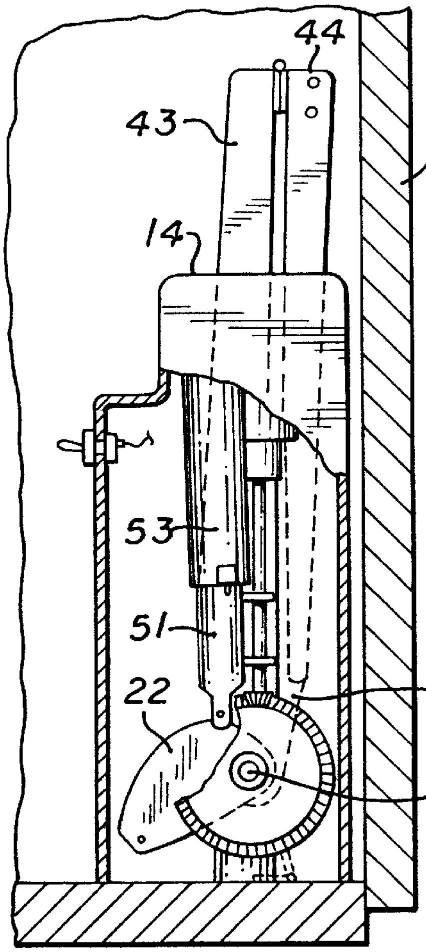
FIG. 4 is a side view of a drive mechanism constructed in accordance with the invention with the ramp retracted.

FIG. 4 is a side view of drive mechanism 14, showing the ramp in its closed position adjacent the drive mechanism and behind sliding door 12 of the minivan. In this configuration, cam 22 has rotated counterclockwise to present a minimum radius between the end of plunger 51 and common shaft 28. Lever arm 24 is approximately vertical. At this point the cam and the lever arm exert minimum torques about common shaft 28 and the net torque is preferably positive, as described above.

Figure 5:
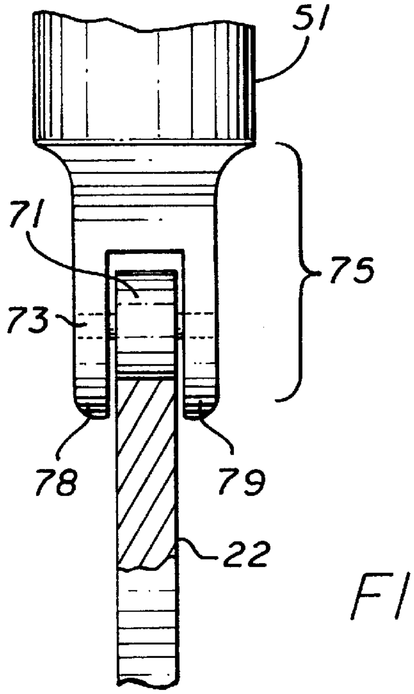
FIG. 5 is a detail illustrating the cam follower.

FIG. 5 illustrates a detail of the invention in which cam 22 engages roller 71 attached by pin 73 to lower end 75 of plunger 51. Roller 71 provides low friction engagement between plunger 51 and cam 22. In addition, lower end 75 includes skirts 78 and 79 extending past the peripheral surface of cam 22 for preventing roller 71 from becoming laterally displaced with respect to cam 22.

Figure 6:
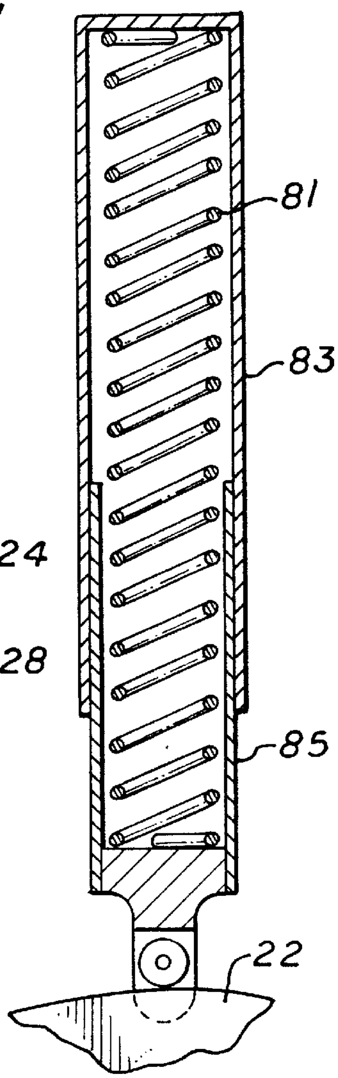
FIG. 6 is a cross-section of a spring used as an energy storage means.

FIG. 6 is a cross section of an energy storage means constructed in accordance with the invention wherein spring 81 is contained within concentric sleeves 83 and 85. Inner sleeve 85 frictionally engages outer sleeve 83 to damp the motion of the ramp. Although illustrated in FIG. 6 as having linearly spaced coils, spring 81 can have non-linearly spaced coils. In one embodiment of the invention, spring 81 was actually two springs positioned end-to-end. This configuration was chosen simply to use commercially available springs and to reduce costs.

Figure 7:
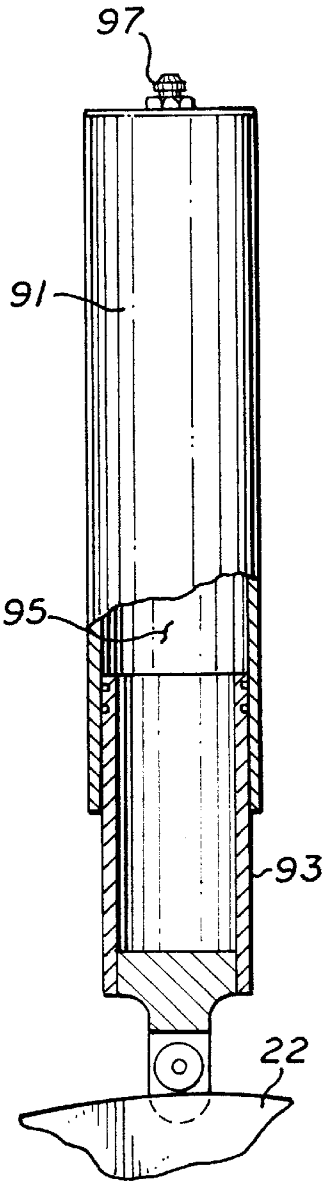
FIG. 7 is a cross-section of a pneumatic tube used as an energy storage means.

FIG. 7 illustrates an alternative embodiment of an energy storage means in which cylinder 91 encloses piston 93 which moves within cylinder 91 to define a chamber 95 having a variable volume. Chamber 95 can be filled with air or a suitable gas such as nitrogen. The initial pressure within chamber 95 is determined by pre-charging the chamber through valve 97. An increase in radius of cam 22 causes piston 93 to enter further into cylinder 91, thereby compressing the gas within chamber 95 and storing energy.

The torque provided by the energy storage means is not sufficient, by itself, to overcome the torque from lever arm 24. It is sufficient, however, to overcome a substantial fraction of the torque on lever arm 24 to enable an individual in a wheelchair to raise and lower the ramp unassisted.

The invention thus provides an electrically powered ramp that can be extended or retracted easily even when there is no electricity available. A drive mechanism stores energy for raising and lowering the ramp without electrical power, thereby reducing the electrical power required to raise or lower the ramp when power is available. The drive mechanism does not require physical disengagement or disassembly for manual operation. One can operate the ramp part-way electrically and the remaining way manually, e.g. for extending the ramp to landscape above street level. Switching between manual and powered operation requires no change in the drive mechanism and the two modes of operation can be used interchangeably. Even when operated manually, the drive mechanism controls the extension of the ramp to prevent the ramp from free-falling. The drive mechanism is relatively compact, about the same volume as drive mechanisms of the prior art, and is as unobtrusive as possible within the minivan.

Having thus described the invention, it will be apparent to those of skill in the art that various modifications can be made within the scope of the invention. For example, one could, in effect, combine a spring and a pneumatic cylinder by using an air spring as an energy storage means. The damping means could be made mechanically more complex than a simple frictional damping means, e.g. a dashpot or shock absorber type of mechanism providing a greater damping force when the ramp is lowered than when the ramp is raised. The motor can drive the common shaft by any suitable means, e.g. by pulleys, by a chain and sprockets, or by a direct connection, but a geared drive is preferred. The motor can be powered electrically, pneumatically, or hydraulically. Although described in connection with a folding ramp, a one-piece ramp could be used instead. One could mechanically attach the gear, the cam, and the lever arm to each other and have the combination freely turn on a common shaft but this is mechanically more complex than it needs to be.

What is claimed is:

1. A drive mechanism for raising or lowering a ramp attached to a minivan, said mechanism comprising:

a common shaft;

a gear, a cam, and a lever arm attached to said common shaft for rotation together about the common shaft;

wherein said lever arm is adapted to raise or lower the ramp as the lever arm rotates with said common shaft;

an electric motor coupled to said gear for causing said gear to rotate; and energy storage means coupled to said cam for storing energy as said ramp is lowered and for releasing energy as said ramp is raised, said energy storage means operating independently of said motor for assisting in raising or lowering said ramp.

2. The drive mechanism as set forth in claim 1 wherein said energy storage means includes means for damping the motion of the ramp.

3. The drive mechanism as set forth in claim 1 wherein said energy storage means includes a spring.

4. The drive mechanism as set forth in claim 1 wherein said energy storage means includes a pneumatic cylinder.

5. The drive mechanism as set forth in claim 1 wherein said motor is coupled to said gear through an electronically controlled clutch.

6. The drive mechanism as set forth in claim 5 wherein said clutch disengages when power to said clutch is interrupted.

7. A minivan adapted for wheelchair access by a ramp attached to the minivan, said minivan comprising:

a motor coupled to the ramp for raising or lowering the ramp; and energy storage means coupled to the ramp for reducing the force needed to raise or lower the ramp, wherein said energy storage means operates independently of said motor to reduce the force needed to raise or lower said ramp.

8. A minivan adapted for wheelchair access by a ramp attached to the minivan, said minivan comprising:

an electric motor mechanically coupled to the ramp for raising and lowering the ramp; and energy storage means mechanically coupled to the ramp for reducing the force needed to raise or lower the ramp;

wherein said motor is coupled to said ramp by a gear driven lever arm and said energy storage means includes a spring coupled to said ramp by a cam attached to said lever arm and a plunger connecting said spring to said cam, wherein said spring applies a lifting force to said lever arm to oppose the force of gravity while raising or lowering said ramp.

* * * * *